United States Patent
Camozzi (10) Patent No.: US 6,866,065 B2
(45) Date of Patent: Mar. 15, 2005

(54) PNEUMATIC VALVE GROUP WITH EASED INSTALLATION AND MAINTENANCE

(75) Inventor: Giovanni Camozzi, Brescia (IT)

(73) Assignee: Camozzi S.p.A., Brescia (IT)

(*) Notice: Subject to any disclaimer, the term of this patent is extended or adjusted under 35 U.S.C. 154(b) by 74 days.

(21) Appl. No.: 10/366,310

(22) Filed: Feb. 13, 2003

(65) Prior Publication Data

US 2003/0155025 A1 Aug. 21, 2003

(30) Foreign Application Priority Data

Feb. 20, 2002 (IT) .................................. MI2002A0338

(51) Int. Cl.$^7$ ............................................. F16K 11/10
(52) U.S. Cl. ............................. 137/625.69; 137/596.76
(58) Field of Search ....................... 137/625.66, 625.69, 137/596.16, 596.18

(56) References Cited

U.S. PATENT DOCUMENTS 5,709,247 A    1/1998  Hutton

FOREIGN PATENT DOCUMENTS

| EP | 0 884 282 | 12/1998 |
|----|-----------|---------|
| EP | 1 134 469 | 9/2001  |

*Primary Examiner*—John Fox
(74) *Attorney, Agent, or Firm*—Hedman & Costigan, P.C.

(57) ABSTRACT

A pneumatic valve group (10) with eased installation and maintenance, comprising in a single body (12) at least one through-duct (16) for supplying compressed air and at least one discharge duct (17) both connected to at least two further through-ducts (14), with a circular section and arranged transversally to such a through-duct (16) for supplying compressed air and at least one discharge duct (17); in at least one of these further ducts (14) spools (22) and relative ferrules or cartridges (18) are inserted, wherein the spools are able to be displaced axially to realise a desired valve function connected to the outside of the body (12) by means of usable passages (32).

11 Claims, 9 Drawing Sheets

PNEUMATIC VALVE GROUP WITH EASED INSTALLATION AND MAINTENANCE

The present invention refers to a pneumatic valve group with eased installation and maintenance.

In the field of pneumatic valves, for requirements of simplification of the installation and maintenance operations, valve groups are used, where the pneumatic valves are arranged next to each other, occupying relatively small spaces.

Such groups which are known in the prior art comprise a common modular base upon which the various valves are mounted, Each valve is thus connected to the common base placing suitable gaskets in between.

In this way, a rationalisation of installation and maintenance is obtained with respect to mounting individual valves next to each other and locked in a pack by tie rods, but various problems remain unsolved. For example, there can be poor seals between valve and common base, as stated above, or between valve and valve, in the case of elements which can be interfaced with each other.

The purpose of the present invention is therefore that of avoiding the aforementioned drawbacks and in particular that of realising a pneumatic valve group with eased installation and maintenance which allows the encumbrance and the number of pieces which are to be managed to be reduced, as well as the poorness of seal to be substantially reduced.

Another purpose of the present invention is that of realising a pneumatic valve group with eased installation and maintenance which allows good flexibility of use, also with the possibility of easy expansion of the number of valves used.

Another purpose of the present invention is that of realising a pneumatic valve group with eased installation and maintenance which is particularly reliable, simple and functional at a relatively low cost.

These and other purposes according to the present invention are achieved by realising a pneumatic valve group with eased installation and maintenance as outlined in claim 1.

Further characteristics are foreseen in the subsequent claims.

The characteristics and advantages of a pneumatic valve group with eased installation and maintenance according to the present invention shall become clearer from the following description, given as an example and not for limiting purposes, referring to the attached schematic drawings, in which:

FIG. 4 is a side section view of FIG. 3a assembled, taken according to the line IV—IV of FIG. 3a;

FIG. 5 is a side section view of FIG. 3a assembled, taken according to the line V—V of FIG. 3a;

With reference to the figures, a pneumatic valve group with eased installation and maintenance is shown, wholly indicated with 10, and in the illustrated example, according to the present invention, comprises a body or blank 12, which is substantially parallelepiped.

Such a body 12 is crossed by through-ducts, generally with a circular section. More specifically, the parallelepiped is crossed by two series of ducts, transversal to each other, for example perpendicular.

A series of first through-ducts 14 crosses the parallelepiped between two side faces, such ducts 14 having axes parallel to each other. They are eight in number in FIG. 1.

A series of second perpendicular through-ducts 16 and 17 intersecting the first ducts 14, crosses the parallelepiped between another two side faces, such ducts 16 and 17 having axes parallel to each other. They are three in number in FIG. 1.

Figure 1:
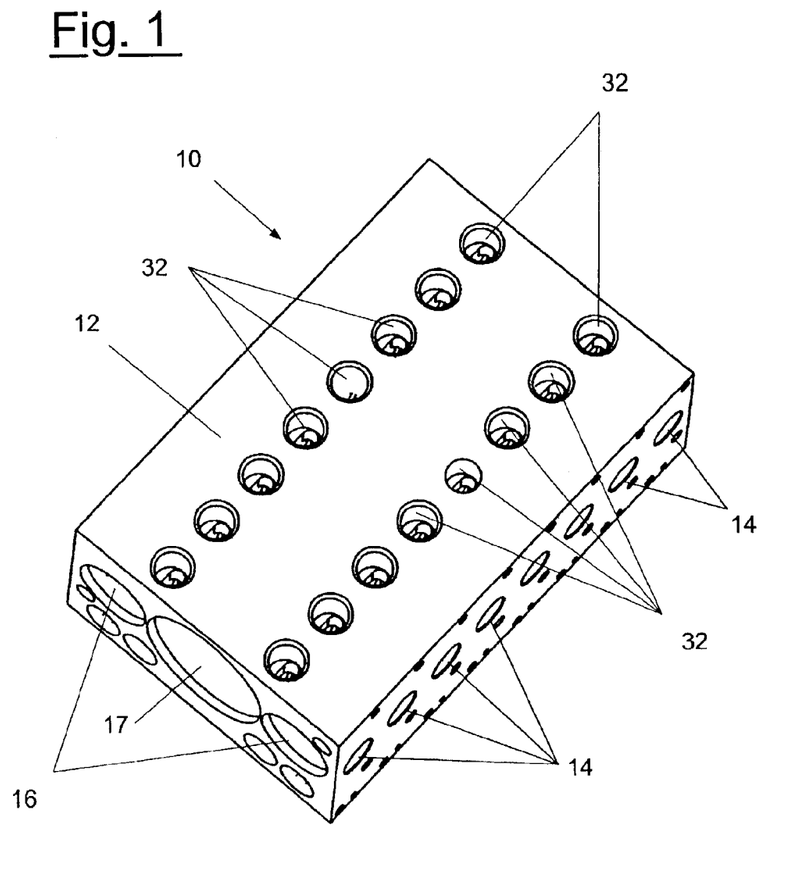
FIG. 1 is an axonometric view of a pneumatic valve group according to the present invention, where up to eight valves can be inserted.

More precisely, in FIG. 1 the first ducts 14 are equally spaced next to each other on the same plane and they have the same section. Still in such a FIG. 1, the second ducts 16 and 17 are on the same plane: more precisely two side through-holes 16 for feeding compressed air and a central discharge duct 17, with a greater diameter than the other two side ones, are foreseen.

Figure 3:
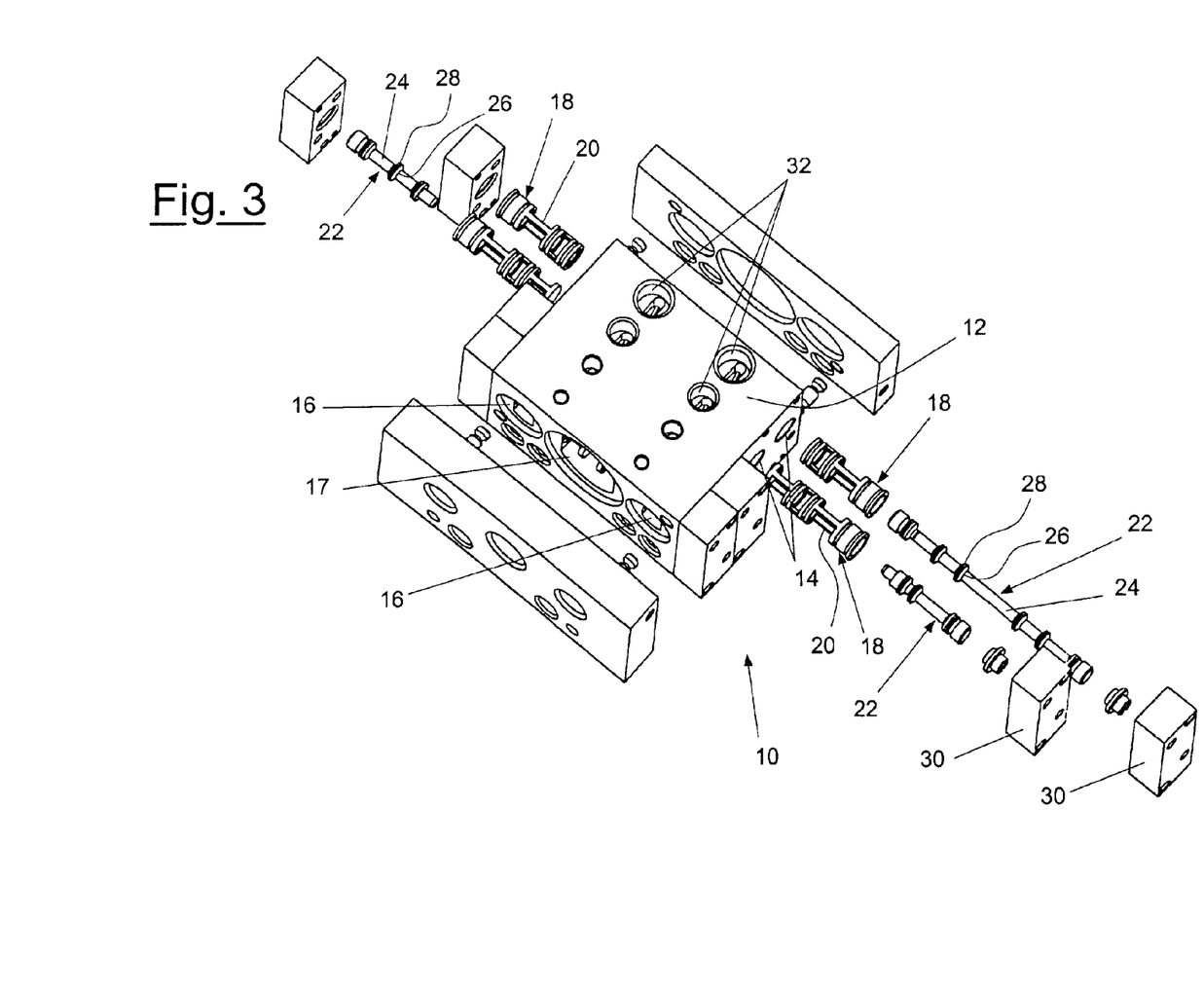
FIG. 3 is an axonometric and exploded view of one of the valve groups shown in FIG. 2, where the components associated with it for its operation, such as ferrules, spools and bases are illustrated.
Figure 3A:
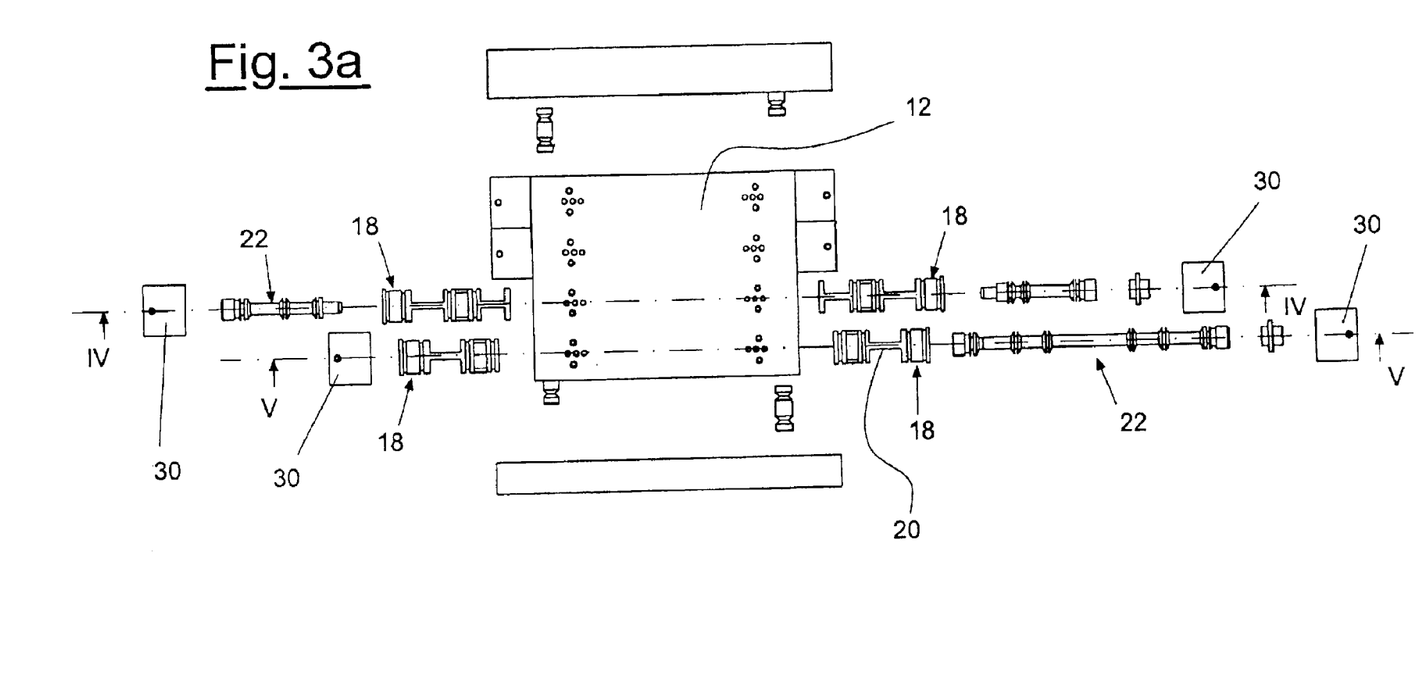
FIG. 3a is a plan view from below of FIG. 3.

As can be seen in FIG. 3 annular ferrules or cartridges 18, having side openings 20, shown in FIGS. 3 and 3a, are inserted and fixed in the first ducts 14.

Inside the ferrules 18, spools 22, comprising a shaft 24 on which shutter elements 26 terminating on the outside with gaskets 28 are arranged suitably distanced, can slide.

According to the invention in these ducts 14 a series of valve arrangements which can be modified as desired is created with different functions by simply varying the type of spool 22 which is inserted in the ferrule 18 or else by actually changing the ferrule. FIG. 3 shows how a short ferrule 18 with a relative spool can be introduced in a duct 14 so as to be able to realise a three-way valve arrangement with two positions. The same figure shows how a long ferrule 18 with a relative spool can also be inserted such as to define a five-way valve arrangement with two positions. Moreover, there can also be further couplings which are not shown.

The ferrules 18 are fixed in position arranging bases 30 on the faces of the parallelepiped of the body 12 where the first ducts 14 terminate, each base 30 covering a single duct 14, as can be seen in FIG. 3. The bases 30 are attached through attachment means, for example screws.

An upper face of the body 12 has a series of usable passages 32, more specifically two passages 32 at each duct 14.

The operation of the pneumatic valve group 10 with eased installation and maintenance according to the invention is clear from that which is described above with reference to the figures, and in brief is the following.

In a single body 12 there are therefore both the through-ducts 16 for supplying compressed air and the discharge duct 17 as well as ferrules and spools of different sizes and with different functions to define valve arrangements according to the user's requirements. Such arrangements are simply obtained by varying such spools and ferrules.

Figure 2:
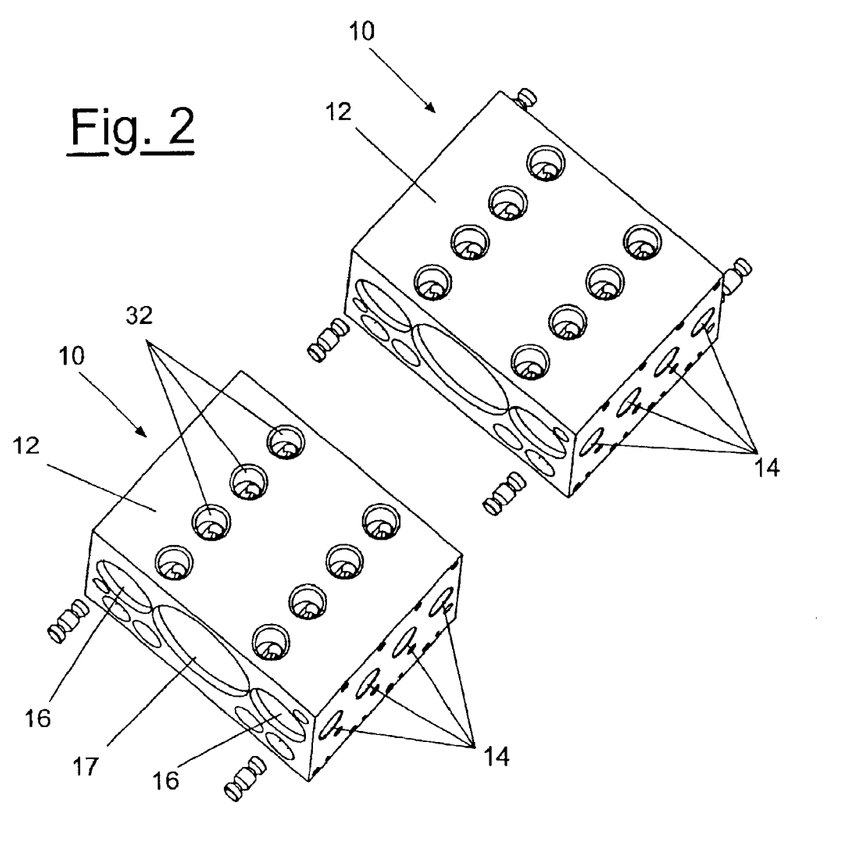
FIG. 2 shows an axonometric and exploded view of two pneumatic valve groups which are connected to each other, with the possibility of up to four valves being inserted in each of such groups.

As can be seen in FIG. 2, it is also possible to extend the valve group 10 simply joining many groups by means, for example, of pins attached by dowels.

The first ducts 14 operate as a housing for valves, whereas the second ducts 16 and 17 respectively act to supply and discharge the compressed air.

Figure 7A:
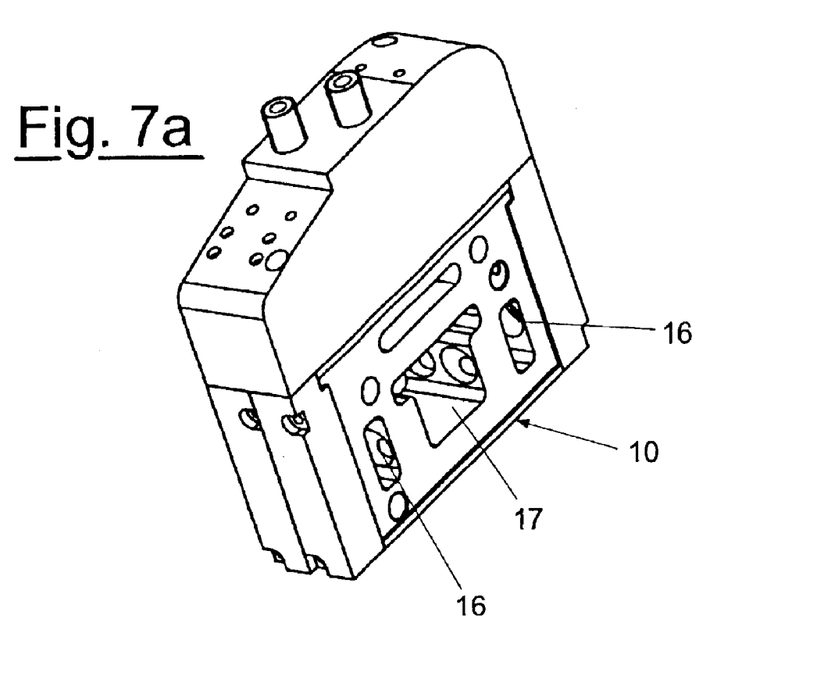
FIGS. 7a, 7b and 7c show axonometric groups of two, four and eight valves, respectively, equipped with plates for electronic connection.
Figure 7B:
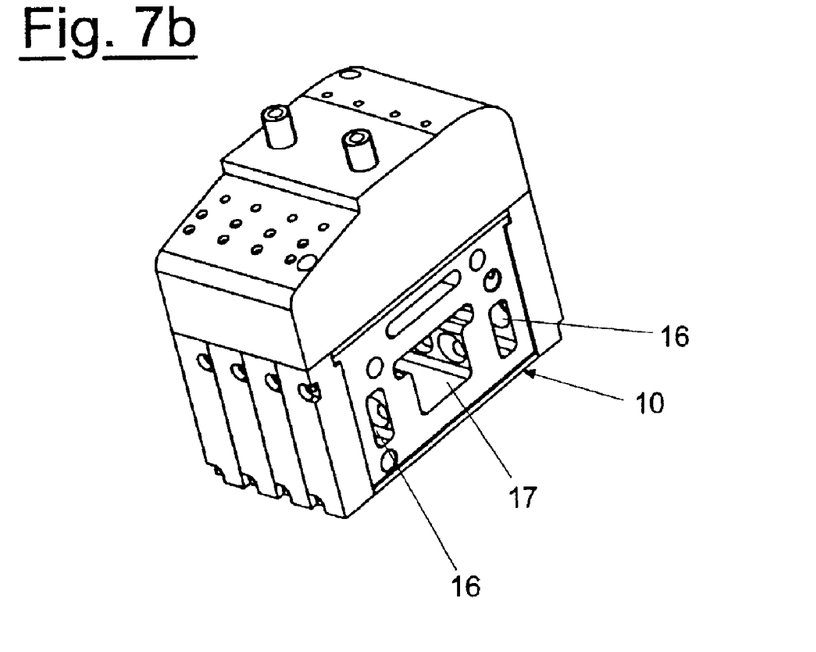
Figure 7C:
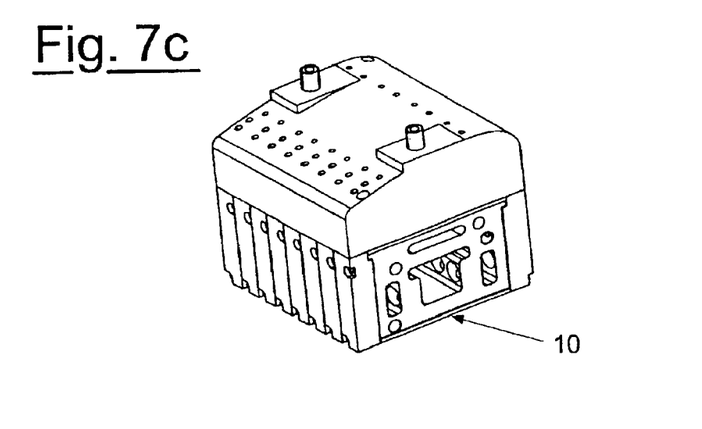

Each duct 14 houses a valve, and the number of ducts 14 depends upon the size of the body 12. In FIGS. 7a, 7b and 7c embodiments with two, four and eight ducts 14 are shown.

As far as the second ducts 16 and 17 are concerned, the two side ones 16 are connected to a compressed air source, whereas the central one 17 functions as a discharge.

Figure 4:
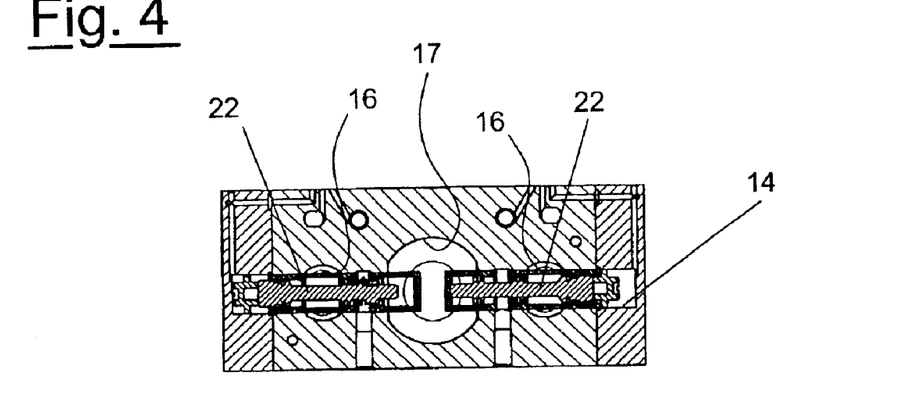
Figure 5:
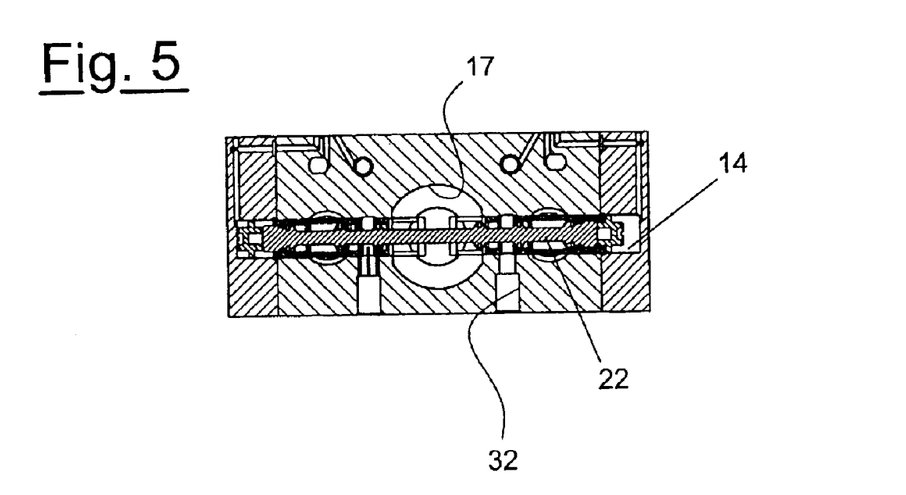

In each duct 14 two ferrules 18, generally made from brass, are inserted, equipped with openings 20. By inserting the spools 22 inside the ferrules 18, the function of a valve is reproduced: by axially displacing the spools 22, compressed air supply and discharge passages are created, through the openings 20 and the second ducts 16 and 17, in the usable passages 32, according to that which is already known in the prior art, as is clearly shown in FIGS. 4 and 5.

At any time it is also possible to insert the different spools 22 and ferrules 18, thus being able to change the function of the valve itself.

Such an operation is carried out with great ease screwing in the attachment screws of the base 30, without having to disconnect or open the entire valve group 10.

An analogous procedure is followed in the case of maintenance, where the intervention is limited to the replacement of the spools 22 and no longer of the entire valve, as happens in the prior art, with significant reductions in the machine idle-time.

Moreover, there is also the possibility of leaving a few ducts 14 free from valves, so as to be available for subsequent integrations.

Figure 6A:
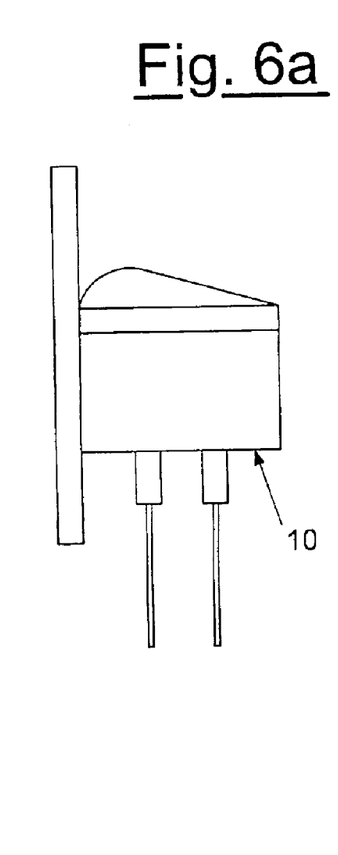
FIGS. 6a, 6b and 6c are side views where three types of connection of the valve groups, according to the invention, are illustrated, with utilities.
Figure 6B:
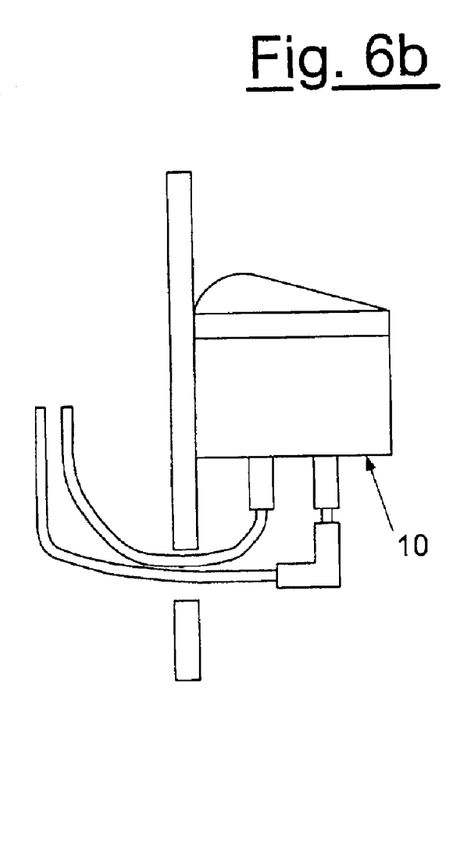
Figure 6C:
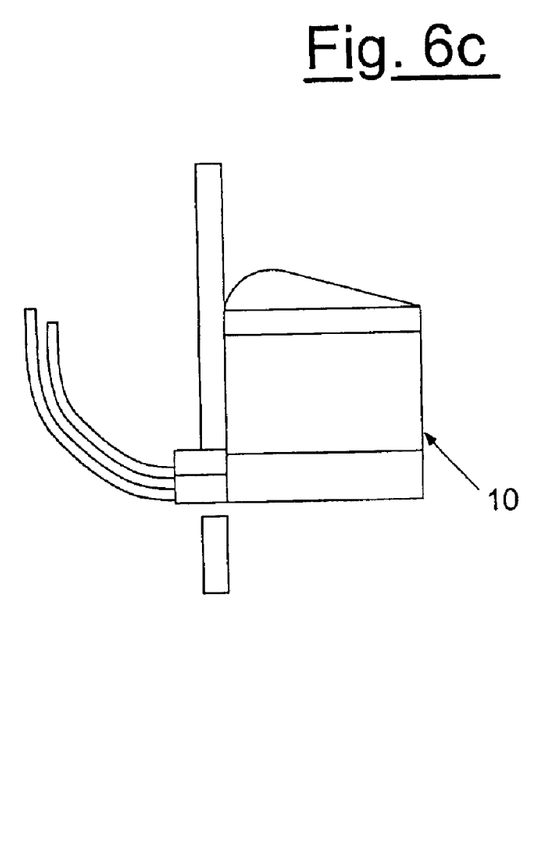

The usable passages 32 can be connected with direct fittings, as is shown in FIGS. 6a and 6b, or advantageously, as can be seen in FIG. 6c, through a plate with rear outlets, thus avoiding the use of bent inserts, reducing the laying times and also improving the aesthetics.

Furthermore, the side ducts 16 for supplying compressed air can be used independently, thus providing the possibility of supplying the valves with different pressures.

Figure 9:
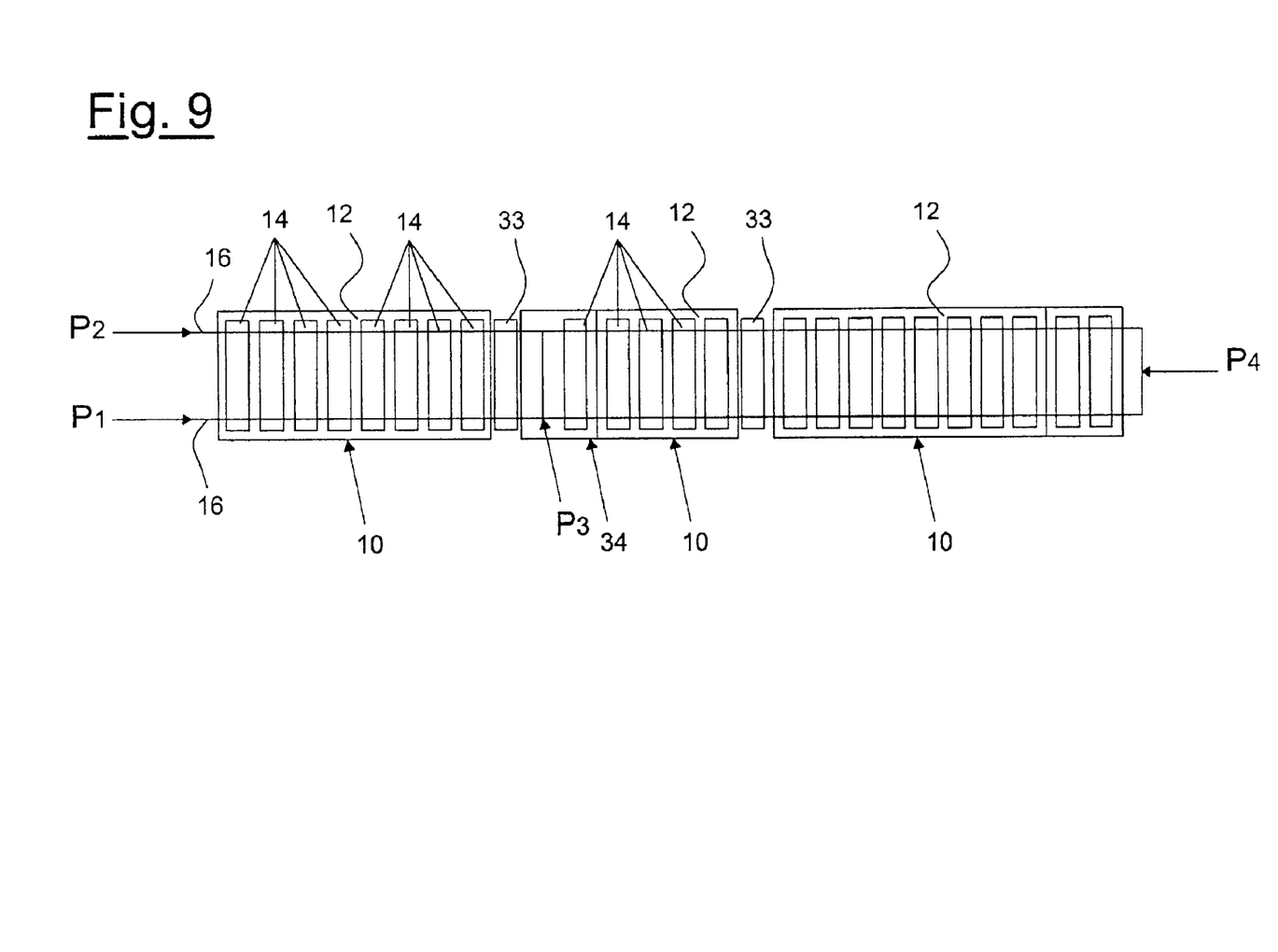
FIG. 9 is a plan view of different groups associated and supplied different pressures.

FIG. 9 shows how it is possible to expand the single group 10 using many bodies 12 coupled together. In FIG. 9 it is shown how between a first body 12 and a second body 12 it is possible to introduce a blind gasket or one with separator disc 33 which allows the ducts 16 to be divided and different pressures to be supplied to the two sides of the blocks 12 themselves. In the example, in the first body 12 in a second duct 16 a pressure P1 is supplied and in a second duct 16 a pressure P2 is supplied, whereas in the second body 12 both ducts 16 are fed with a pressure P3 by an expansion module 34. Between the expansion module 34 and the second body 12, on the other hand, a usual gasket (not shown) is introduced which allows the bodies to be associated with the same pressure P3. The introduction of a blind gasket 33 between the second body 12 and the third body 12 allows the third body, i.e. both ducts 16, to be supplied with a pressure P4 which is different to P3.

The pneumatic drive signal to the valves of the group 10 according to the invention, can be obtained by means of small electrodrivers mounted at the top of the body 12.

The electrodrivers are connected through gripper connection to an electronic board housed near to the body 12 in a casing for covering the group 10, thus mirroring the modularity of the pneumatic part.

Outside of the casing, status LEDs and manual commands can be seen.

Furthermore, the groups 10 can be interfaced with various command systems, with point-to-point connections using single connectors, or else with multipolar or serial connections.

As far as the electronics associated with the group 10 is concerned, it is possible to connect a selected serial directly to the group 10, without using intermediate boards.

Figure 8:
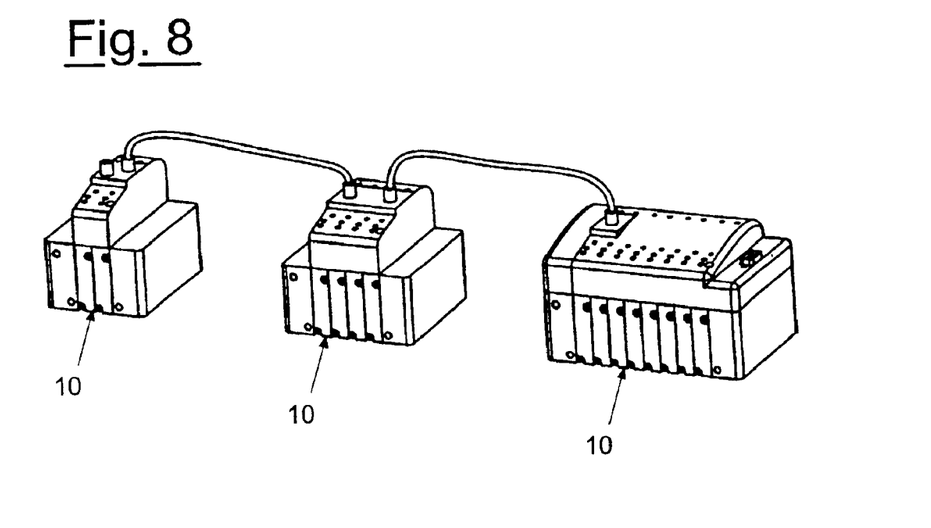
FIG. 8 is an axonometric view of the three valve groups of FIGS. 7a, 7b and 7c, connected to each other in a forked structure.

In FIG. 8 a forked structure for connecting different groups 10 is illustrated. The initial module generally has eight valves and is the only one which needs a connection to the mains and to a serial line. The successive expansion modules with two, four or eight valves are connected using a prelaid cable.

In this way, by exploiting these possibilities of expansion of the initial module, the number of valve groups 10 required, with the respective connectors and cablings, can be reduced, thus allowing a reduction in costs.

From the description which has been carried out the characteristics of the pneumatic valve group with eased installation and maintenance object of the present invention are clear, just as the relative advantages are clear, amongst which we recall:

simple and reliable use;

elimination of the gasket between valves and common base of the prior art;

elimination of the tie rods for holding together the various constituent parts;

flexibility of operation, with the possibility of expansion;

ease of installation and maintenance, also decreasing the number of components to be managed;

reduced costs, with respect to the prior art.

Finally, it is clear that the pneumatic valve group with eased installation and maintenance thus conceived is susceptible to numerous modifications and variants, all covered by the invention. Moreover, all of the details can be replaced by technically equivalent elements. In practice, the materials used, as well as the shapes and sizes, can be whatever according to the technical requirements.

The scope of protection of the invention is therefore defined by the attached claims.

What is claimed is:

1. Pneumatic valve group (10) with eased installation and maintenance, which comprises in a single body (12) at least one through-duct (16) for supplying compressed air and at least one discharge duct (17) both connected to at least two further through-ducts (14), with a circular section and arranged transversally to said at least one through-duct (16) for supplying compressed air and at least one discharge duct (17), in at least one of said further ducts (14) being inserted spools (22) and relative ferrules or cartridges (18), in said ferrules or cartridges (18) said spools being able to be displaced axially to provide a desired valve function connected to the outside of said body (12) by means of usable passages (32) wherein said further through-ducts (14) have axes which are parallel to each other and which perpendicularly intersect said at least one through-duct (16) supplying compressed air and at least one discharge duct (17).

2. Valve group (10) according to claim 1, wherein said body (12) is parallelepiped shape and in that said at least one through-duct (16) for supplying compressed air and at least one discharge duct (17) have a circular section, are parallel to each other and are perpendicular to said further ducts (14).

3. Valve group (10) according to claim 1, wherein said ferrules or cartridges (18) are annular and have side openings (20) and in that said spools (22) comprise a shaft (24) on which shutter elements (26) terminating on the outside with gaskets (28) are arranged.

4. Valve group (10) according to claim 2, wherein said ferrules (18) are fixed in position arranging bases (30) on the faces of the parallelepiped of the body (12) where said further duct (14) end, each base (30) covering a single duct (14), said bases (30) being attached through attachment means.

5. Valve group (10) according to claim 1, wherein said usable passages (32) are two in number for each said further duct (14).

6. Valve group (10) according to claim 1, wherein in each of said a further ducts (14), two ferrules (18) are inserted.

7. Valve group (10) according to claim 1, wherein at least two of said valve groups (10) are joined together by means of pins attached by dowels.

8. Valve group (10) according to claim 7, wherein between said at least two valve groups (10) a blind gasket or a gasket with a separator disc (33) is inserted which allows the ducts (16) of said at least two groups to be divided and which allows said ducts to be supplied at different pressures at the two sides of the blocks (12) of said groups.

9. Valve group (10) according to claim 1, wherein said usable passages (32) are connected to utilities through a plate with rear outlets.

10. Valve group (10) according to claim 1, wherein a pneumatic drive signal is provided by means of electrodrivers.

11. Valve group (10) according to claim 10, wherein said electrodrivers are connected through a gripper connection to an electronic board housed near to said body (12) in a casing for covering said group (10).

* * * * *